United States Patent
Rischer et al.

(10) Patent No.: US 10,300,650 B2
(45) Date of Patent: May 28, 2019

(54) METHOD FOR PRODUCING AN ELASTOMER FLOOR COVERING HAVING A DECORATIVE LAYER AND AN ELASTOMER FLOOR COVERING WITH A DECORATIVE LAYER

(71) Applicant: Nora Systems GmbH, Weinheim (DE)

(72) Inventors: Dieter Rischer, Absteinach (DE); Mario Kroeger, Bruchsal (DE)

(73) Assignee: NORA SYSTEMS GMBH, Weinheim (DE)

( * ) Notice: Subject to any disclaimer, the term of this patent is extended or adjusted under 35 U.S.C. 154(b) by 615 days.

(21) Appl. No.: 14/783,726

(22) PCT Filed: Mar. 27, 2014

(86) PCT No.: PCT/EP2014/000825
§ 371 (c)(1),
(2) Date: Oct. 9, 2015

(87) PCT Pub. No.: WO2014/166597
PCT Pub. Date: Oct. 16, 2014

(65) Prior Publication Data
US 2016/0297132 A1 Oct. 13, 2016

(30) Foreign Application Priority Data

Apr. 11, 2013 (DE) .......... 10 2013 103 663

(51) Int. Cl.
*B29L 9/00* (2006.01)
*B29D 99/00* (2010.01)
(Continued)

(52) U.S. Cl.
CPC .......... *B29C 48/157* (2019.02); *B32B 37/025* (2013.01); *E04F 15/163* (2013.01);
(Continued)

(58) Field of Classification Search
CPC .... B29C 47/028; E04F 15/163; B32B 37/025; B32B 2319/00; B32B 2309/105;
(Continued)

(56) References Cited

U.S. PATENT DOCUMENTS 2,339,142 A * 1/1944 Bodle ................ A47G 27/0468
24/DIG. 11
2,521,992 A * 9/1950 Nielsen ..................... B44C 1/26
156/238

(Continued)

FOREIGN PATENT DOCUMENTS

CA 2 315 473 A1 2/2001
CN 1 273 166 C 11/2000
(Continued)

OTHER PUBLICATIONS

English language abstract of Canadian Patent Publication No. CA 2 315 473 A1 and machine-assisted English language translation of the specification and claims from the equivalent European Patent Publication No. 1 077 394 A1 extracted from www.espacenet.com on Nov. 18, 2016; 5 pages.

(Continued)

*Primary Examiner* — Jeffrey M Wollschlager
(74) *Attorney, Agent, or Firm* — Dean W. Amburn; Giroux Amburn PC

(57) ABSTRACT

An exemplary method for manufacturing an elastomeric flooring comprises: providing a first rubber mixture (2); providing a decor carrier material (6) comprising areas with a decor layer (7) wherein the decor layer (7) contains a second rubber mixture; shaping the first rubber mixture (2) by converting it to a rubber web (5); applying the decor carrier material (6) comprising the decor layer (7) onto the rubber web (5), wherein the decor layer (7) comes in contact with the rubber web (5); vulcanizing the rubber web (5) with the decor layer (7) applied to it, wherein the decor layer (7)

(Continued)

bonds to the rubber web (5); and removing the decor carrier material (6).

20 Claims, 7 Drawing Sheets

(51) Int. Cl.
| | | |
|---|---|---|
| *B29K 21/00* | (2006.01) | |
| *B29L 31/00* | (2006.01) | |
| *B32B 37/00* | (2006.01) | |
| *B32B 38/00* | (2006.01) | |
| *E04F 15/16* | (2006.01) | |
| *B29C 48/157* | (2019.01) | |

(52) U.S. Cl.
CPC ...... *B29D 99/0057* (2013.01); *B29K 2021/00* (2013.01); *B29L 2009/00* (2013.01); *B29L 2031/7324* (2013.01); *B32B 38/145* (2013.01); *B32B 2038/0076* (2013.01); *B32B 2309/105* (2013.01); *B32B 2319/00* (2013.01); *B32B 2471/00* (2013.01)

(58) Field of Classification Search
CPC .......... B32B 2038/0076; B32B 38/145; B32B 2471/00; B29L 2031/7324; B29L 2009/00; B29K 2021/00; B29D 99/0057
See application file for complete search history.

(56) References Cited

U.S. PATENT DOCUMENTS

| | | | | |
|---|---|---|---|---|
| 2,559,649 | A * | 7/1951 | Little | B44C 1/1712 |
| | | | | 156/231 |
| 2,940,887 | A * | 6/1960 | McClure | B29D 99/0057 |
| | | | | 156/220 |
| 3,202,738 | A * | 8/1965 | Reichert | B29C 43/20 |
| | | | | 156/242 |
| 3,279,968 | A * | 10/1966 | Wisotzky | B05D 1/28 |
| | | | | 156/209 |
| 3,770,536 | A * | 11/1973 | Haigh | B32B 27/00 |
| | | | | 156/182 |
| 3,951,714 | A * | 4/1976 | Franco | B44C 3/025 |
| | | | | 156/277 |
| 4,131,592 | A * | 12/1978 | Davis | C08L 9/08 |
| | | | | 524/322 |
| 4,225,374 | A * | 9/1980 | Kaufmann | B32B 37/26 |
| | | | | 156/220 |
| 4,312,686 | A * | 1/1982 | Smith | B29C 43/305 |
| | | | | 156/209 |
| 4,405,539 | A * | 9/1983 | Schulte | B44C 3/10 |
| | | | | 264/145 |
| 4,678,528 | A * | 7/1987 | Smith | B32B 38/0036 |
| | | | | 156/220 |
| 5,281,290 | A | 1/1994 | Bosler | |
| 5,824,735 | A | 10/1998 | Graab et al. | |
| 5,932,317 | A * | 8/1999 | Kerr | A47L 23/266 |
| | | | | 156/437 |
| 6,589,631 | B1 * | 7/2003 | Suzuki | A47G 27/0231 |
| | | | | 15/215 |
| 6,709,732 | B1 * | 3/2004 | Graab | B29C 70/64 |
| | | | | 428/143 |
| 6,931,811 | B2 * | 8/2005 | Thiers | B44C 1/24 |
| | | | | 428/195.1 |
| 7,288,308 | B2 | 10/2007 | Graab et al. | |
| 7,976,666 | B2 | 7/2011 | Morooka | |
| 8,834,974 | B1 * | 9/2014 | Ferry | B41M 1/32 |
| | | | | 156/240 |
| 2006/0281841 | A1 * | 12/2006 | Weller | C07F 7/1836 |
| | | | | 524/261 |
| 2009/0318614 | A1 * | 12/2009 | Chevalier | C09C 1/0093 |
| | | | | 524/588 |
| 2012/0070637 | A1 * | 3/2012 | Gross | B32B 3/00 |
| | | | | 428/201 |
| 2012/0252954 | A1 | 10/2012 | Grun et al. | |
| 2012/0277365 | A1 * | 11/2012 | Mercier | C08L 23/16 |
| | | | | 524/426 |
| 2012/0322925 | A1 * | 12/2012 | Arigo | C08K 9/06 |
| | | | | 524/262 |
| 2013/0150518 | A1 * | 6/2013 | Grun | B29C 43/30 |
| | | | | 524/521 |
| 2014/0242337 | A1 | 8/2014 | Kroeger et al. | |
| 2015/0072111 | A1 | 3/2015 | Rischer et al. | |
| 2017/0157977 | A1 | 6/2017 | Hannig | |

FOREIGN PATENT DOCUMENTS

| | | |
|---|---|---|
| CN | 102592508 A | 7/2012 |
| DE | 19507113 C1 | 2/1996 |
| DE | 19915729 A1 | 11/2000 |
| DE | 102010036120 A1 | 3/2012 |
| DE | 102010036122 A1 | 3/2012 |
| DE | 102011114597 A1 | 4/2013 |
| DE | 102012005312 A1 | 9/2013 |
| EP | 1475490 A2 | 11/2004 |
| EP | 1930152 A1 | 6/2008 |
| FR | 2951454 A1 | 4/2011 |
| GB | 637384 A | 5/1950 |
| KR | 20120106856 A | 9/2012 |
| KR | 20160149306 A | 12/2016 |

OTHER PUBLICATIONS

English language abstract of Chinese Patent Publication No. CN 1 273 166 C; see English language equivalent U.S. Pat. No. 6,709,732 B1 extracted from www.espacenet.com on Nov. 18, 2016; 1 page.

International Search Report for International Application No. PCT/EP2014/00825 dated Jul. 7, 2014.

German Search Report for German Application No. 10 2013 103 663.5 dated Feb. 12, 2014.

Machine-assisted English language translation abstract, specification and claims of Chinese Application No. CN 102592508 A extracted from www.espacenet.com on Jul. 27, 2017; 7 pages.

* cited by examiner

METHOD FOR PRODUCING AN ELASTOMER FLOOR COVERING HAVING A DECORATIVE LAYER AND AN ELASTOMER FLOOR COVERING WITH A DECORATIVE LAYER

RELATED APPLICATIONS

This application is the National Stage of International Patent Application No. PCT/EP2014/000825, filed Mar 27, 2014, which claims priority to and all the advantages of German Patent Application No. DE 10 2013 103 663.5, filed on Apr 11, 2013, the entire contents of which are hereby incorporated by reference.

TECHNICAL FIELD

The disclosure relates to a method for manufacturing an elastomeric flooring with a decor layer.

Elastomeric floorings are well known. They are used as high-quality floorings in buildings. Because of their beneficial properties, elastomeric floorings are especially appreciated in the object area. They also provide a large variety of color, design, and surface variants.

BACKGROUND OF THE DISCLOSURE

DE 199 15 729 A1 describes an elastomeric flooring whose upper side forms a decor surface. In this case, decor elements are embedded in the rubber sheet of the flooring in such a way that the decor elements are visible from above. DE 195 07 113 C1 describes a random-patterned elastomeric flooring with two or three basic colors. EP 1 475 490 A1 describes an elastomeric flooring with a structured surface. DE 10 2010 036 122 A1 describes an elastomeric flooring in which the matrix contains particles of a thermoplastic material.

SUMMARY OF THE DISCLOSURE

An exemplary method for manufacturing a flooring can provide enhanced design possibilities. In addition, one exemplary method can provide a flooring with a decor layer.

The method for manufacturing an elastomeric flooring with a decor layer can include the following steps:
  Providing a first rubber mixture;
  Providing a decor carrier material comprising areas with a decor layer, wherein the decor layer contains a second rubber mixture;
  Shaping the first rubber mixture by converting it to a rubber web;
  Applying the decor carrier material comprising the decor layer onto the rubber web, wherein the decor layer comes in contact with the rubber web;
  Vulcanizing the rubber web and the decor layer applied to it, wherein the decor layer bonds to the rubber web;
  Removing the decor carrier material.

In this way, the surface of the elastomeric flooring can be designed in a particularly attractive way. An almost unlimited variety of graphic designs is possible—both in form and color of the decor layer. The decor carrier material with the decor layer can be prefabricated and kept available without any problems. Manufacturing of the decor carrier material and of the decor layer can also take place independently, both in time and space, of manufacturing the continuous rubber web. In this way, manufacturing the flooring is simplified and manufacturing costs are kept down. The beneficial properties of the elastomeric flooring can be fully maintained. Disadvantages in terms of quality can be avoided.

The initial rubber mixture can be produced, e.g. in a mixer and then made available for use. Giving shape to the first rubber mixture by converting it to a continuous rubber web can be done by rolls, e.g. calendar rolls. In this way, the rubber web can, for example, be formed as a rubber sheet. The rubber sheet can either be further processed or divided into sections of limited length, which form the elastomeric flooring panels or elastomeric flooring tiles after vulcanization. Vulcanization of the rubber web can, in the case of the rubber sheet, take place in a continuous vulcanization device, e.g. AUMA (automatic vulcanization machine). In the case of sections of limited length, vulcanization can take place in a press.

In one non-limiting example of the method, the first rubber mixture and the second rubber mixture contain at least one common rubber polymer. This improves, amongst other things, workability. An especially secure and durable hold of the decor layer on the vulcanized rubber web can be achieved after vulcanization. A further improvement is achieved when the first rubber mixture and the second rubber mixture comprise the same rubber polymers.

A particularly advantageous embodiment of the invention provides that the decor layer is printed in advance onto the decor carrier material. Screen printing has proved to be particularly advantageous. Different graphic designs of the decor layer can be particularly easily and cost-effectively realized by means of printing.

It is also advantageous when the decor carrier material provided is manufactured with the decor layer by:
  Providing a decor carrier material, particularly in sheet form;
  Providing the second rubber mixture for the decor layer;
  Providing at least one first template with contoured cutouts, whereby the first template has a limited length;
  Placing the first template onto the decor carrier material and adding the second rubber mixture to the decor carrier material through the cutouts of the first template to form a first section of the decor layer;
  Advancing the carrier material;
  Again placing the first template or placing a second template with limited length and comprising contoured cutouts onto the decor carrier material and adding the second rubber mixture or an additional third rubber mixture onto the decor carrier material through the cutouts in the first or second template to form a second section of the decor layer.

These measures make high-quality and cost-effective manufacturing possible. The decor layer can be manufactured particularly well using the first template. It is sufficient to place the template on the decor carrier material and apply the second rubber mixture through the cutouts of the template onto the decor carrier material. This can take place, for example, by screen printing or serigraphy. Even when the template has a limited length, the application of a decor layer to a decor carrier material in sheet form is possible when its length exceeds the length of the template many times over. In this way, the first template can be applied again after advancing the decor carrier material, wherein for example the decor carrier material has been shifted relative to the position on which the template is placed, before in turn the second rubber mixture (or a further rubber mixture) is applied to the decor carrier material. Alternatively or additionally, a second template with contoured cutouts can be put on. In this way, the decor carrier material in sheet form can be progressively coated with the decor layer over its entire length.

The second rubber mixture can be produced by mixing and then be provided. The same applies, if necessary, for the further rubber mixture that can, for example, differ in color from the second rubber mixture. In this, the viscosity of the rubber mixture is adapted in such a way that the second rubber mixture (or further rubber mixture) can be applied through the cutouts in the template onto the decor carrier material and can be spread. The carrier material in sheet form can be, for example, paper or film, wherein the materials are selected and/or set up in such a way that they can withstand the loads during manufacturing, especially during vulcanization.

When the decor carrier material is produced together with the decor layer, the first template can be placed a second time or the second template can be placed offset to the first placing in such a way that the second section of the decor layer has an overlapping area with the first section of the decor layer. This can be achieved by advancing the decor carrier material in a corresponding manner. In this way, a particularly uniform design is achieved. Contoured templates, like those used in screen printing, for example, do not normally allow a print without any gaps. A gap-free design of the decor can be achieved using this exemplary method, especially in a method for manufacturing sheet form floorings. The first section and the second section of the decor layer are aligned in this overlap area. The second section can be arranged on or above the first section. The second section can however also be arranged next to the first section.

As a further example, the method can include adding the decor layer to the decor carrier material in at least two passes. These passes can be performed separately in that for example in a first pass, as already described, the first template is placed on the decor carrier material and the second rubber mixture is applied to the decor carrier material using the first template. A drying of this part of the decor layer can then be carried out. The drying has the advantage that in the subsequent pass, previously applied parts of the decor layer can no longer be smeared. In the second pass, a further sub-area of the decor layer is applied to the decor carrier material using the first template (or the second or further template). The second rubber mixture or further rubber mixture is used for this. In this way, a seamless, continuous decor layer can be very effectively produced. Even when in the first pass an intermediate area between two consecutively applied sections of the decor layer contains no decor layer for technical reasons, this area can be printed on in the second pass.

The exemplary method provides that the decor carrier material with the decor layer has been produced by using the second rubber mixture provided, whereby a solvent has been added to the second rubber mixture before the second rubber mixture is applied to the decor carrier material and wherein the second rubber mixture has been dried after being applied to the decor carrier material. In this way, a particularly low viscosity can be achieved for the second rubber mixture, which facilitates the application using a template and allows for a particularly uniform quality and thickness of the decor layer. Drying can take place preferably by the application of heat.

In an advantageous manner, provision is made that the decor layer contains a reinforcing filler, e.g. silicic acid. In this way, not only is the durability of the decor layer improved, but the formation of a firm bond with the elastomeric web is made easier. A further improvement is achieved here if the reinforcing filler is silanized. Silanization can take place in wet-process, dry-process or according to the in-situ process during the mixing process of the second rubber mixture.

The exemplary method can provide the decor layer on the decor carrier material, and the decor layer contains no cross-linking system. This makes manufacturing even easier. The decor carrier material with the decor layer can then be stored for much longer periods. This also enables the decor carrier material to be stored for longer periods without reducing product quality.

A further improvement provides that the first rubber mixture contains a cross-linking system and that the cross-linking system of the first rubber mixture diffuses from the rubber web into the decor layer after the application of the decor carrier material with the decor layer onto the rubber web. In this way, the decor layer is also vulcanized without any problem during vulcanization of the rubber web. Enhanced temperatures before or during vulcanization accelerate the diffusion.

The exemplary method can include the second rubber mixture containing at least one pigment. The first rubber mixture can also contain a pigment. The first and the second rubber mixtures preferably contain different pigments and/or different quantities of the same pigment.

The exemplary method can include the thickness of the decor layer being between 0.01 mm and 0.5 mm—preferably between 0.015 mm and 0.05 mm. This has been successful in manufacturing and contributes to good durability of the flooring.

The exemplary method can include the abrasion of the decor layer after vulcanization, as measured in accordance with ISO 4649, and being less than 250 mm$^3$, preferably less than 180 mm$^3$. Abrasion or abrasion resistance is determined here using procedure A of ISO 4649 with a loading of 5 N.

A flooring is obtainable by using the exemplary method described above. Such a flooring is especially suitable for use in buildings.

The first rubber mixture, the second rubber mixture and/or the further rubber mixture can contain at least one rubber selected from the group: NR (natural rubber), BR (polybutadiene), IR (polyisoprene), SBR (styrene-butadiene rubber), NBR (acrylonitrile-butadiene rubber), EPM (ethylene-propylene rubber), EPDM (ethylene-propylene-diene rubber), IIR (butyl rubber), CR (chloroprene rubber), IR (polyisoprene). SBR, NBR, NR, EPDM and mixtures of these are particularly preferred.

The first rubber mixture, the second rubber mixture and/or the further rubber mixture can contain at least one filler selected from the following group: Silicic acid, chalk, kaolin, silica, magnesium silicate, alumina hydrate, aluminum silicate, calcium carbonate, magnesium carbonate, calcium silicate, barium sulfate, zinc carbonate, calcined kaolin, calcium oxide, magnesium oxide, titanium dioxide, aluminum oxide, silanized kaolin, silanized silicate. Especially preferred are light-colored fillers as these are more suitable for coloring. A light-colored filler specifically excludes carbon black. However, this does not mean that the respective rubber mixture may not also contain a certain amount of carbon black in addition to a light-colored filler. Especially preferred fillers are: silicic acid, silica, and/or kaolin. These fillers are especially suitable for combined use with pigments.

The first rubber mixture can have at least one cross-linking system. Cross-linking with sulfur is particularly suitable. Sulfur or a sulfur donor can be used here. Peroxides are also suitable as a cross-linking medium. The cross-linking system can also have a cross-linking accelerator. A person skilled in the art will select one of the suitable, known cross-linking systems depending on the rubber used. The cross-linking system can have a cross-linking additive, which ensures bonding of the polymer to the filler(s). Such a cross-linking additive can preferably contain silane.

Vulcanization of the rubber web can take place under heat and pressure. If the rubber web is in sheet form, vulcanization can take place, for example, in an automatic vulcanization machine, AUMA.

Further objectives, features, advantages and applications of the present invention are given in the following description of implementations with the help of the drawing. All features described and/or illustrated by themselves, or in any reasonable combination, form the subject-matter of the invention in individual claims or their references—even independently of the summary.

DETAILED DESCRIPTION

Figure 1:
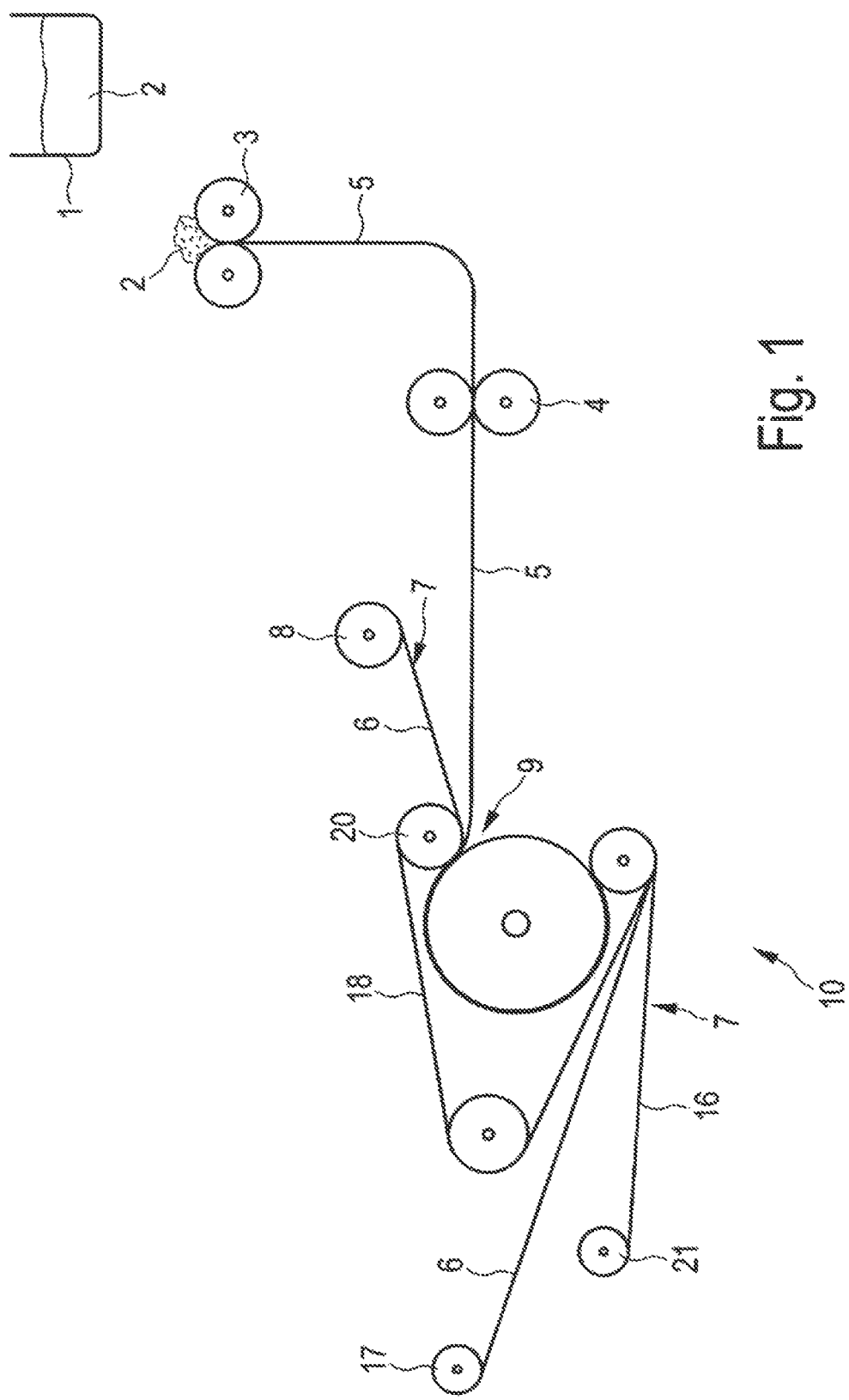
FIG. 1 is a schematic representation of the manufacturing process of the elastomeric flooring.

FIG. 1 shows a schematic representation of the manufacturing process of an elastomeric flooring. A first rubber mixture 2 is prepared in a vessel 1. The mixture is produced by mixing its components in a mixer. The rubber mixture 2 can be produced, for example, according to the following recipe:

| Component | Weight proportion |
|---|---|
| Precipitated silicic acid | 30.000 |
| Silica | 160.000 |
| SBR with 23% styrene | 75.000 |
| SBR with 70% styrene | 10.000 |
| Zinc oxide | 3.740 |
| Polyethylene glycol | 1.000 |
| Stearic acid | 1.000 |
| Paraffin | 1.000 |
| Sulfur | 2.500 |
| Cyclohexyl benzothiazyl sulfenamide | 2.000 |
| Tetramethyl diuram disulfide | 1.300 |
| Bis(triethoxysilylpropyl) tetrasulfide | 1.000 |

A pigment (or a pigment mixture) can also be added to the first rubber mixture to give the rubber mixture the desired color.

The mixture components can be processed with suitable mixing equipment until a homogeneous rubber mixture is obtained.

The first rubber mixture can be shaped by calendering using rolls 3, 4. The rubber mixture 2 is inserted between the rolls 3. This produces a rubber web 5. The rubber web 5 can be produced in the form of a sheet. In this way, especially a continuous rubber sheet can be produced. The rubber sheet is brought to the desired thickness using the additional rolls 4. The representation of the rolls 3, 4 in FIG. 1 is schematic and just serves to illustrate the manufacturing principle.

Further, a decor carrier material 6 comprising areas with a decor layer 7 (cf. also FIGS. 2 and 3) is also provided. The decor layer 7 contains a second rubber mixture.

In the schematic representation of the exemplary embodiment, the decor carrier material 6 with the decor layer 7 is provided on a roll 8. This roll is pivot mounted; the decor carrier material 6 can thus be unwound from the roll.

In region 9, the decor carrier material 6 with the attached decor layer 7 is applied to the rubber web 5. In this, the decor layer 7 is arranged on the side of the decor carrier material 6 facing the rubber web 5. The decor layer 7 therefore comes in contact with the rubber web 5 over a contact surface.

In the exemplary embodiment shown, the rubber web 5 with the decor carrier material 6 applied to it is introduced continuously into an automatic vulcanization device 10. The decor carrier material 6 is pressed against the rubber web 5 by roll 20 of the vulcanization device 10. The rubber web 5 with the decor layer 7 on top is then vulcanized in the vulcanization device 10. Vulcanization takes place while applying heat and mechanical pressure, which causes the decor carrier material 6 and especially the decor layer 7 arranged on it to be pressed firmly against the rubber web 5. For this purpose, the vulcanization device 10 has a metal belt 18. During vulcanization the rubber web 5 bonds to the decor layer 7 by means of chemical cross-linking. The resulting elastomeric flooring 16 is now permanently covered with the decor layer 7 and can be wound onto a roll 21.

After vulcanization, the decor carrier material 6 is removed from the rubber web 5 and wound onto a roll 17. The decor layer 7 is no longer present on the decor carrier material 6 but has bonded with the rubber web 5 to the vulcanized elastomeric flooring 16.

In the exemplary method, the decor carrier material 6 comprising the decor layer 7 can be manufactured as follows. A decor carrier material, particularly in sheet form, is provided. In particular, this material may be a film, paper or non-woven material. The respective material can be coated so that it can be removed from the flooring 16 after vulcanization without any problem. The decor carrier material 6 in sheet form can, for example, be provided on a roll.

The second rubber mixture is also provided. The second rubber mixture is adapted to the first rubber mixture so that a good bond between decor layer 7 and the rubber web 5 is obtained after vulcanization. For this, the second rubber mixture can contain at least one rubber polymer that is also contained in the first rubber mixture. It is preferred that the first and the second rubber mixture have the same polymers. A good bonding between decor layer 7 and rubber web 5 is especially achieved when the first and second rubber mixtures are prepared using the same recipe. The second rubber mixture can contain a pigment or a pigment mixture in order to color the rubber mixture. If a pigment with a different color or different pigment mixture is used for the second rubber mixture than for the first rubber mixture, a color contrast between the decor layer and the rubber web is obtained. In addition, provision can be made that the first and second rubber mixtures contain the same pigment or the same pigment mixture in different concentrations.

Processing is made easier if the second rubber mixture does not contain a cross-linking system. Accordingly, cross-linking substances such as sulfur and cross-linking accelerators such as cyclohexyl benzothiazyl sulfenamide and tetramethyl diuram disulfide are not used in the second rubber mixture. The second rubber mixture and the decor layer 7 made from it therefore remain stable when stored.

If necessary, a further rubber mixture can be used in the invention. Preferably, this mixture contains the same components as the second rubber mixture.

However, the second and third rubber mixtures can have different pigments or pigment mixtures so that different colors in the decor layer can be obtained.

To facilitate the subsequent application of the second or third rubber mixture, a rubber solution can be created from the second and, if applicable, from the third rubber mixture respectively, by adding a solvent to considerably lower viscosity. As the rubber mixture is a multi-component mixture, only the relevant polymer is dissolved while the fillers are present in a fine dispersion.

Furthermore, at least a first template 11 is provided. This has contoured cutouts 12. The prepared template can have a limited length.

Figure 2:
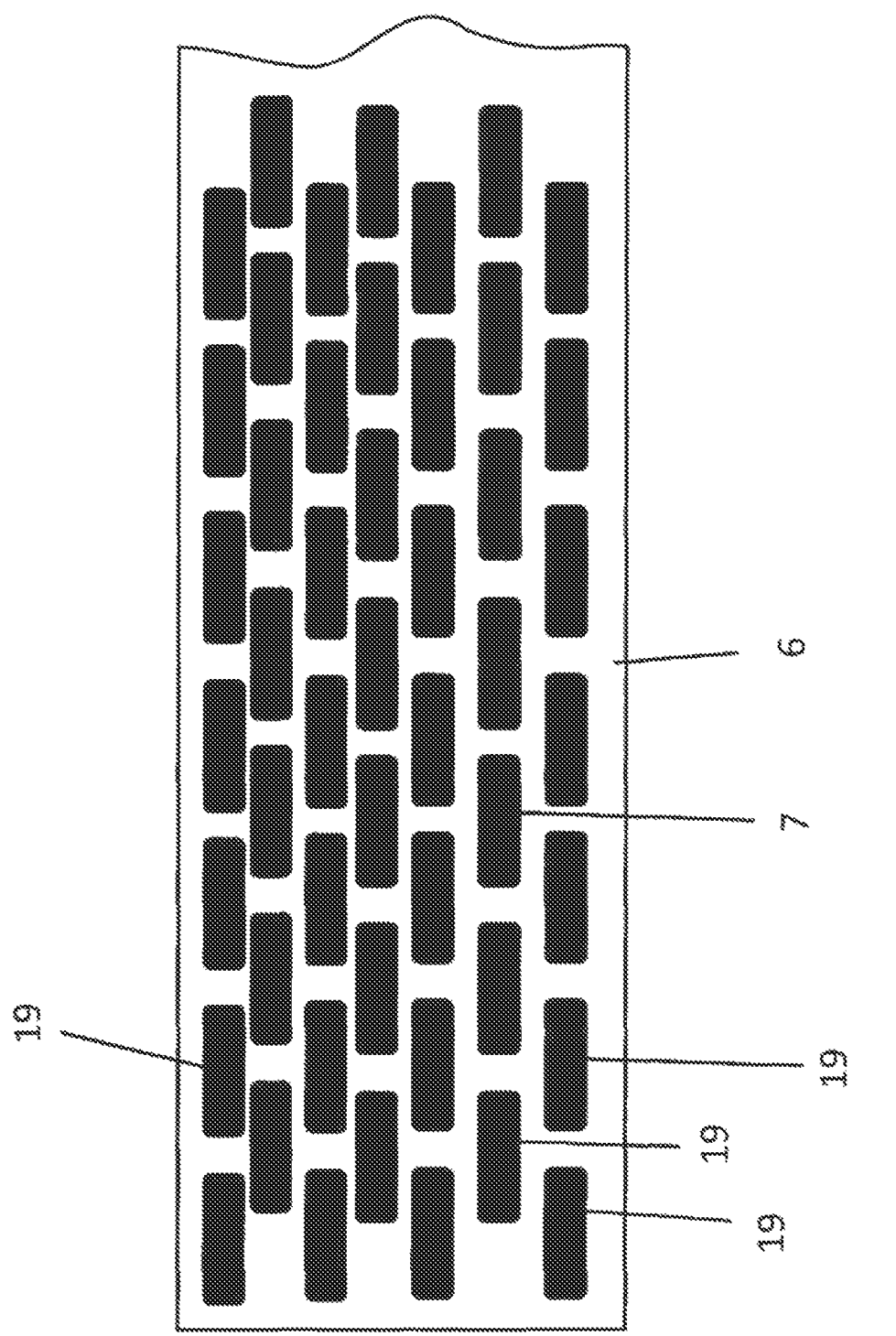
FIG. 2 is a schematic representation of a first embodiment of the decor carrier material.

FIG. 2 shows a section of decor carrier material 6 in sheet form. The decor carrier material comprises areas of the decor layer 7. In the exemplary embodiment, the decor layer 7 consists of many fields 19 arranged next to each other.

Figure 3:
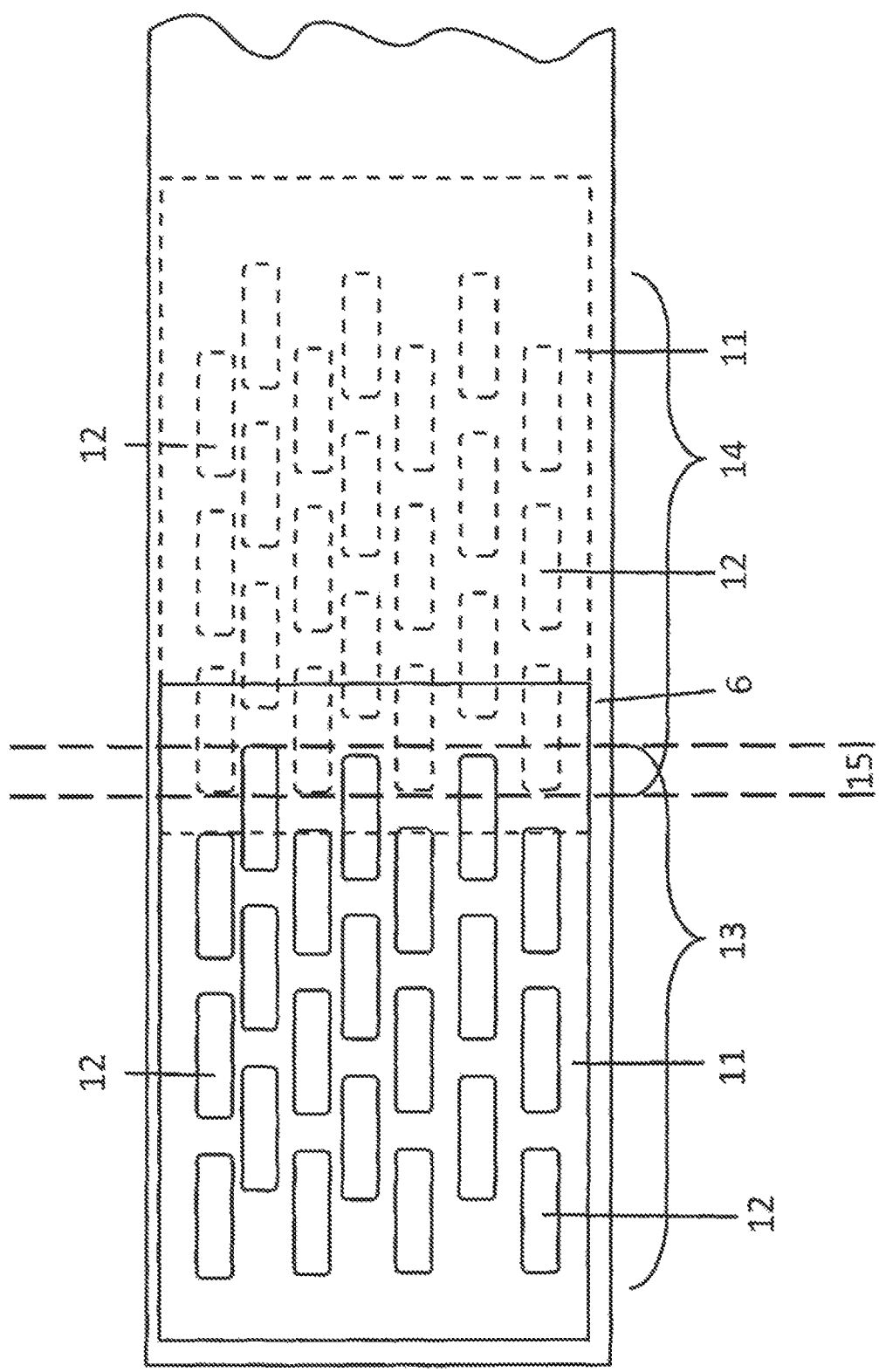
FIG. 3 is a schematic representation of the coating of the decor carrier material of FIG. 2 using a template.

FIG. 3 shows a schematic representation of manufacturing of the decor carrier material 6 shown in FIG. 2 by means of a first template 11. The template 11 has contoured cutouts 12. Their form corresponds to the fields 19 of the decor layer 7. Once the template 11 has been placed on the decor carrier material 6, the second rubber mixture can be added to the decor carrier material 6 through the cutouts 12 of the template 11, for example by spreading the second rubber mixture over the template using a scraper. In this way, a first section 13 of the decor layer 7 is formed.

The first template 11 can then be placed on the decor carrier material 6 again, but offset from its first position. This position of template 11 is shown by dashed lines in FIG. 3. As an alternative, it is possible to use a second template (not shown) that also has contoured cutouts. In this case, depending on the desired decor, the first template 11 and the second template are provided with identical or different cutouts 12. After the renewed placing of the first template 11 (or the placing of the second template), the second rubber mixture or the further rubber mixture is applied to the decor carrier material 6 through the cutouts 12 of the first template 11 (or through the cutouts of the second template) onto the decor carrier material 6. In this way, a second section 14 of the decor layer 7 is obtained.

The renewed placing of the first template 11 (or the placing of the second template) takes place offset to the first placing of the first template 11. By repeating this process, the sheet-like decor carrier material 6 can be covered with the decor layer 7 step-by-step over its entire length. In addition, the second section 14 of the decor layer 7 has an overlap area 15 with the first section 13. This is shown in FIG. 3. In this way, a continuous decor layer 7 can be achieved although the template 11 has a circumferential peripheral area in which no cutouts 12 are provided. The invention is not restricted to the use of only a second and a third rubber mixture. Rather, further rubber mixtures can also be used when subsequently placing the template again, if necessary. The use of further templates is equally possible.

Drying takes place to drive off the solvent once the second rubber mixture, or the third rubber mixture, has been applied. After drying, a decor layer 7 remains, which is sufficiently stable for the decor carrier material 6 to be transported and stored together with the decor layer 7. The decor carrier material 6 is preferably rolled up in this condition.

The reinforcing filler contained in the decor layer 7 improves the later bonding of decor layer 7 and rubber web 5 as well as the durability. This filler can preferably be silanized.

The second and, if applicable, the further rubber mixture contain no cross-linking system. As a consequence, the decor layer 7 also contains no cross-linking system. In this way, it is stable during storage and can be prefabricated long before the actual flooring is manufactured. In contrast, the first rubber mixture contains a cross-linking system. After the decor carrier material 6 with the decor layer 7 has been applied to the rubber web 5, the cross-linking system diffuses from the rubber web 5 into the decor layer 7. As the decor layer 7 has only a low thickness, the decor layer 7 can be vulcanized together with the rubber web 5. In this, the decor layer 7 bonds permanently to the rubber web 5 due to cross-linking. In this way, detachment of the decor layer 7 after vulcanization is safely prevented.

The decor layer is applied with a thickness between 0.01 mm and 0.5 mm, preferably with a thickness between 0.015 mm and 0.05 mm.

Abrasion of the decor layer, measured according to ISO 4649, is less than 250 $mm^3$ after vulcanization, preferably less than 180 $mm^3$.

Figure 4:
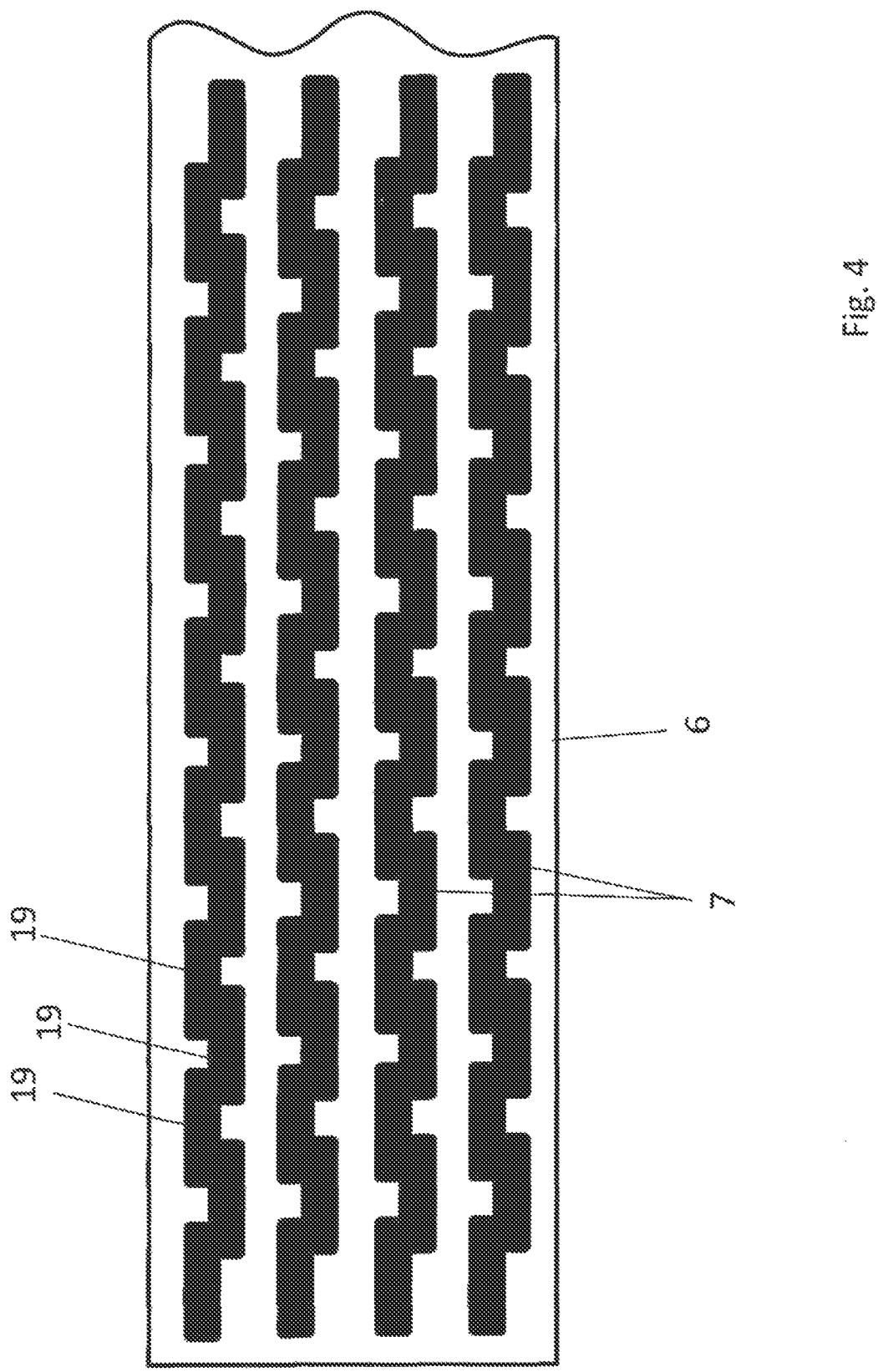
FIG. 4 is a schematic representation of a second embodiment of the decor carrier material.

FIG. 4 shows a further embodiment of the decor carrier material 6 according to the invention. The decor layer 7 applied to the decor carrier material 6 is again easily recognizable. The decor layer has many fields 19. The fields 19 are mutually offset, but arranged in such a way that each field 19 merges into two neighboring fields 19.

Figure 5:
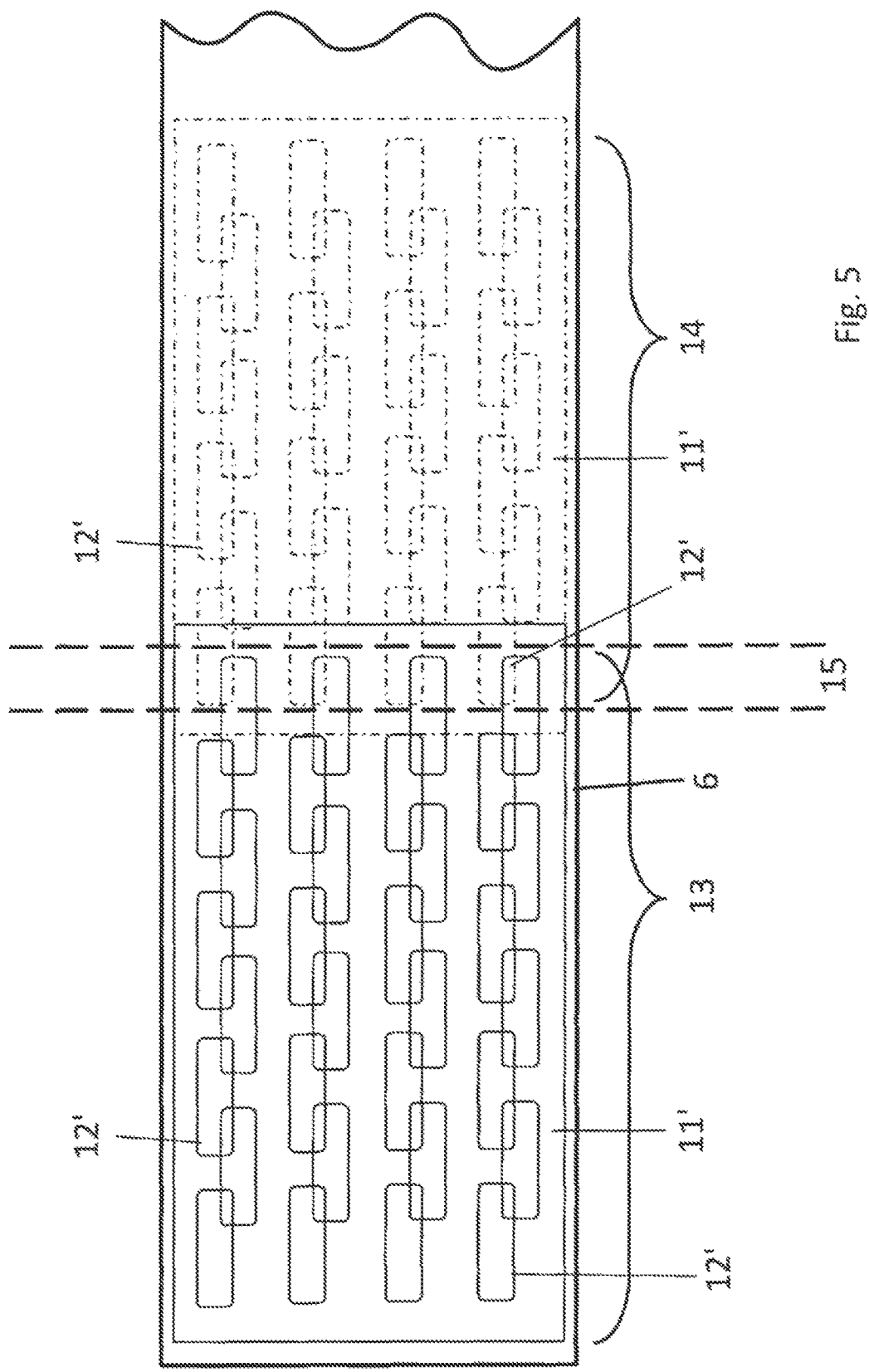
FIG. 5 is a schematic representation of the coating of the decor carrier material of FIG. 4 using a template.

FIG. 5 illustrates the manufacturing of the decor layer 7 by means of a template 11'. The template 11' has cutouts 12' which correspond to the fields 19. To make the illustration simpler, the respective position of the fields 19 is drawn. In fact, where two fields 19 merge into each other, the cutout 12' is continuous. Firstly, the second rubber mixture is applied in a first area 13 to the decor carrier material 6 by means of template 11'. The template 11' is then applied again, but offset, to the decor carrier material. This position is shown by dashed lines in FIG. 5. The second rubber mixture (or a further rubber mixture) can now be applied in the second area 14 through the cutouts 12'. As shown, the first and second areas 13, 14 have in turn an overlap area 15. In this exemplary embodiment, the cutout 12' is arranged in such a way that it is placed partially above a field 19 produced in the previous pass. In this area, the decor layer 7 is therefore formed by two superimposed layers of the second (or third, if applicable) rubber mixture.

Figure 6A:
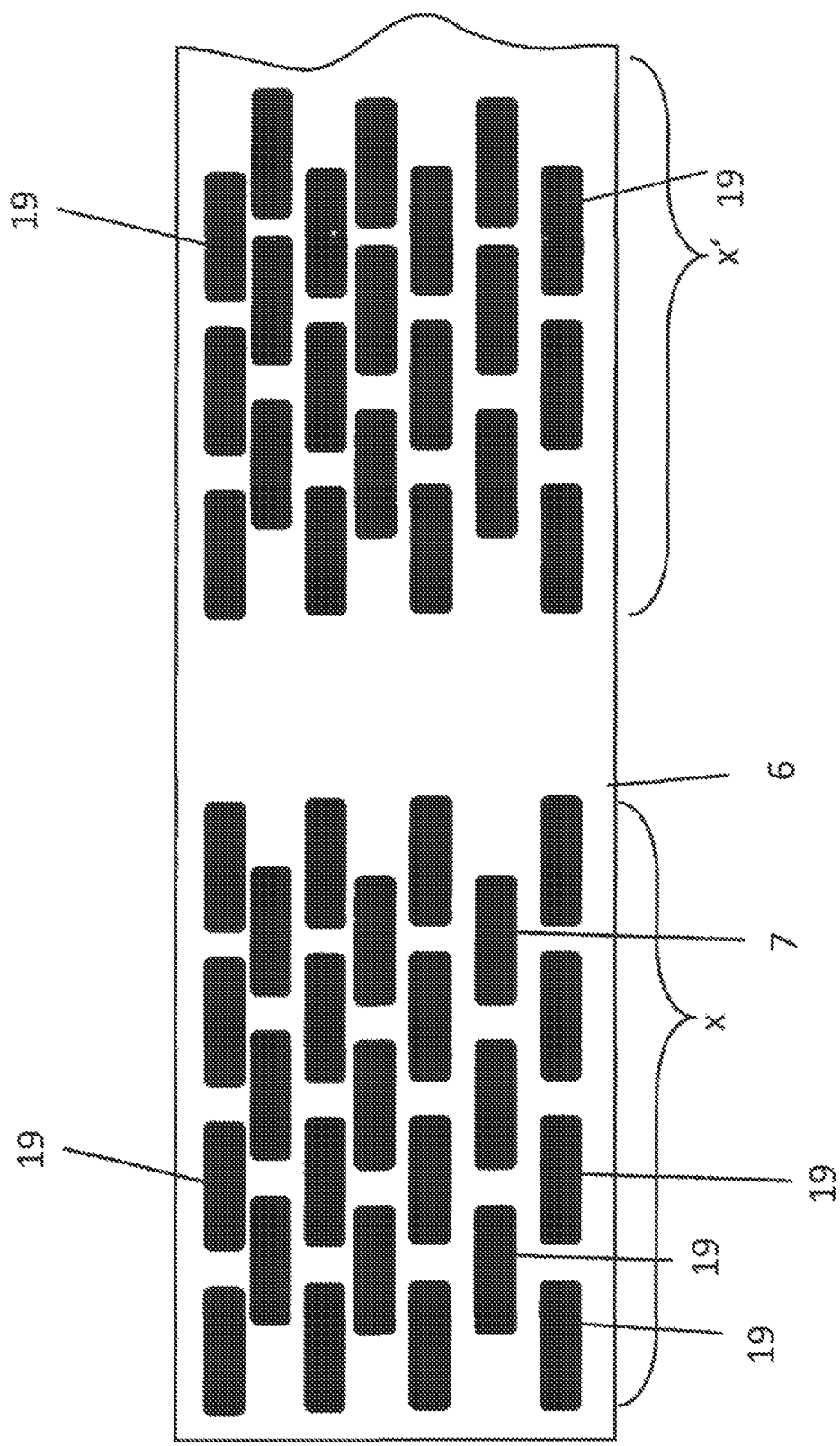
FIG. 6*a* is a schematic representation of the coating of the decor carrier material in one pass.
Figure 6B:
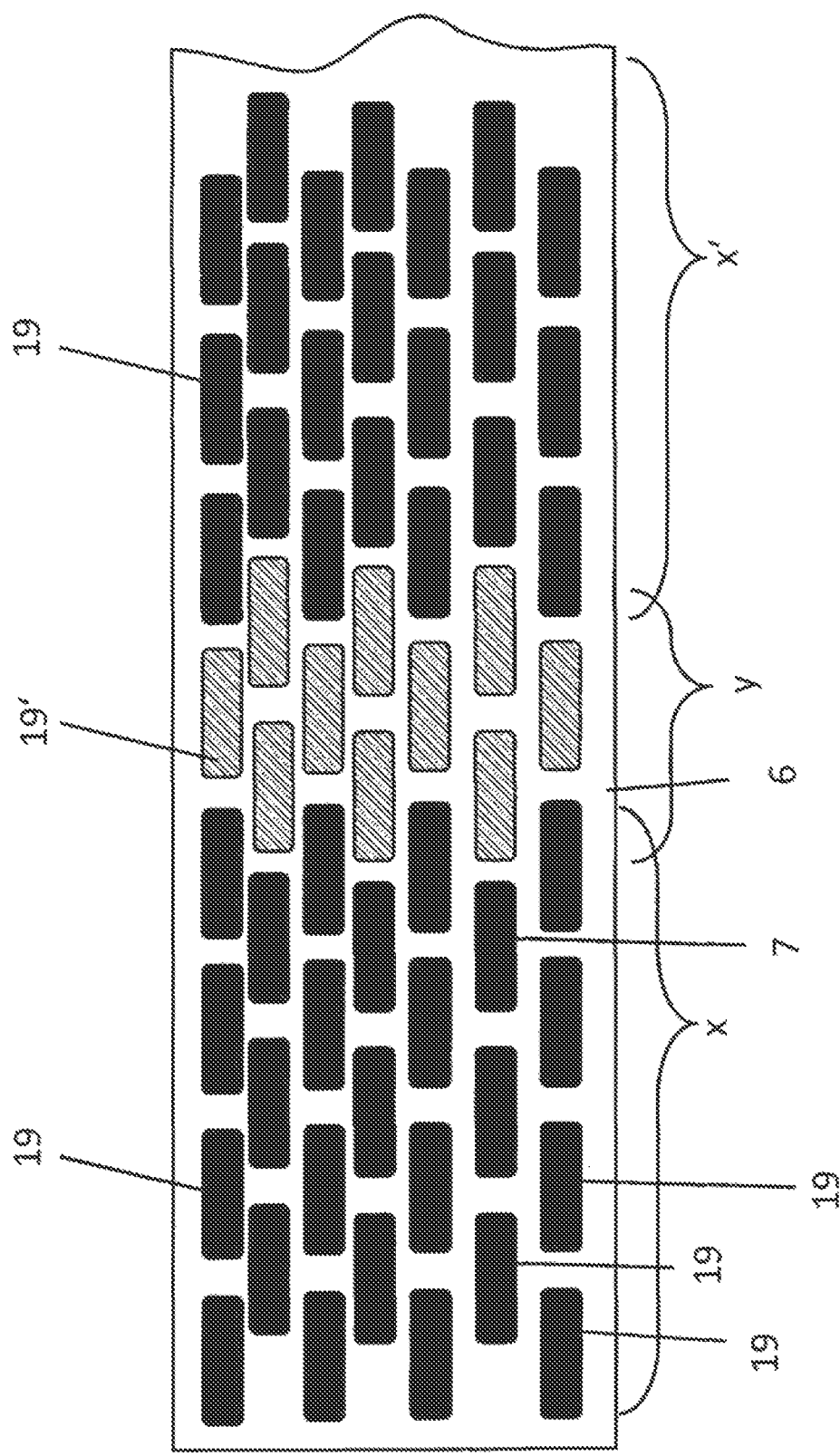
FIG. 6*b* is a schematic representation of the coating of the decor carrier material of FIG. 6*a* in another pass.

FIGS. 6a and 6b show a schematic representation of the coating of the decor carrier material 6 with the decor layer 7 in several passes. Firstly, the first subareas X and X' of the decor layer 7 are produced in a first pass. This is shown in FIG. 6a. In this, as described above, the first template—not shown here—is used to apply the first rubber mixture through the cutouts in the first template onto the decor carrier material 6. The results of this are the fields 19 in subarea X. Then, the decor carrier material is advanced. The first template is placed on the decor carrier material again so that the first rubber mixture is applied in the subarea X' in order to create the fields 19 in this area. Similarly, with further advancing and placing of the template, the decor carrier material 6 can be coated step-by-step over its entire length. In each case and for technical reasons, an intermediate area Y can remain between the subareas X and X' in which no decor layer is present. The decor layer 7 manufactured so far is then dried.

A second pass then follows. In the second pass, second subareas Y of the decor layer 7 are produced. For this, a second template (not shown) is placed on the decor carrier material and the second rubber mixture (or a further rubber mixture) is applied through the cutouts in the template onto the decor carrier material 6 in order to produce the fields 19' in the intermediate area Y (cf. FIG. 6*b*). The fields 19' are shaped like the fields 19. For a clearer representation, the fields 19' produced during the second pass are hatched in FIG. 6*b*. By advancing the decor carrier material 6 and applying the second template again, the subareas Y lying respectively between the two subareas X, X' can be produced step-by-step. Fields 19' produced in the second pass are then dried.

In this way, it is also possible to complement the decor layer in the second pass in subarea Y if, for technical reasons, subarea Y was not covered by the decor layer 7 in the first pass. This allows for a continuous decor layer, even under the described conditions. The pattern shown is only meant as an example for illustration purposes. A large number of different patterns can actually be produced in this way.

It is possible, as shown in exemplary embodiment of FIGS. 6*a* and 6*b*, that subarea Y produced in the second pass is an intermediate area. It can be provided that subarea Y produced in the second pass overlaps completely or partly with a subarea X or X' produced in the first part.

What is claimed is:

1. A method for manufacturing an elastomeric flooring, said method comprising;
   providing a first rubber mixture having a cross-linking system;
   providing a decor carrier material comprising areas with a decor layer, wherein the decor layer contains a second rubber mixture containing no cross-linking system;
   shaping the first rubber mixture by converting it to a rubber web;
   applying the decor carrier material comprising the decor layer onto the rubber web, wherein the decor layer comes in contact with the rubber web;
   vulcanizing the rubber web and the decor layer applied to it, wherein the decor layer bonds to the rubber web; and
   removing the decor carrier material.

2. The method according to claim 1, wherein the first rubber mixture and the second rubber mixture contain at least one common rubber polymer.

3. The method according to claim 1, wherein the first rubber mixture and the second rubber mixture comprise the same rubber polymers.

4. The method according to claim 1, wherein the decor layer has been printed in advance onto the decor carrier material, wherein said printing was done by screen printing.

5. The method according to claim 1, wherein the decor carrier material with the decor layer has been manufactured by:
   providing the decor carrier material in sheet form;
   providing the second rubber mixture for the decor layer;
   providing at least one first template with contoured cutouts, whereby the template has a limited length;
   placing the first template onto the decor carrier material and adding the second rubber mixture to the decor carrier material through the cutouts of the first template to form a first section of the decor layer;
   advancing the carrier material;
   again placing the first template or placing a second template with limited length and comprising contoured cutouts onto the decor carrier material and adding the second rubber mixture or an additional third rubber mixture, which has been provided, onto the decor carrier material through the cutouts in the first template or through the cutouts in the second template to form a second section of the decor layer.

6. The method according to claim 5, wherein the decor carrier material provided has been produced together with the decor layer, in that again placing of the first template or placing of the second template is made offset to the first placing in such a way that the second section of the decor layer has an overlapping area with the first section of the decor layer.

7. The method according to claim 5, wherein the decor layer has been added to the decor carrier material in at least two passes.

8. The method according to claim 5, wherein the decor carrier material with the decor layer has been produced by using the second rubber mixture provided, whereby a solvent has been added to the second rubber mixture before the second rubber mixture is applied to the decor carrier material and wherein the second rubber mixture has been dried after being applied to the decor carrier material.

9. The method according to claim 1, wherein the decor layer contains a reinforcing filler wherein the reinforcing filler is silanized.

10. The method according to claim 1, wherein the decor layer provided on the decor carrier material contains a further rubber mixture to the second rubber mixture containing no cross-linking system.

11. The method according to claim 1, wherein the cross-linking system of the first rubber mixture diffuses from the rubber web into the decor layer after the application of the decor carrier material with the decor layer onto the rubber web.

12. The method according to claim 1, wherein the second rubber mixture contains at least one pigment.

13. The method according to claim 1, wherein the thickness of the decor layer is between 0.01 mm and 0.5 mm.

14. The method according to claim 1, wherein the abrasion of the decor layer after vulcanization, measured in accordance with ISO 4649 is less than 250 $mm^3$.

15. The method according to claim 2, wherein the decor layer has been printed in advance onto the decor carrier material, wherein said printing was done by screen printing.

16. The method according to claim 3, wherein the decor layer has been printed in advance onto the decor carrier material, wherein said printing was done by screen printing.

17. The method according to claim 2, wherein the decor carrier material with the decor layer has been manufactured by:
   providing the decor carrier material, in sheet form;
   providing the second rubber mixture for the decor layer;
   providing at least one first template with contoured cutouts, whereby the template has a limited length;
   placing the first template onto the decor carrier material and adding the second rubber mixture to the decor carrier material through the cutouts of the first template to form a first section of the decor layer;
   advancing the carrier material;
   again placing the first template or placing a second template with limited length and comprising contoured cutouts onto the decor carrier material and adding the second rubber mixture or an additional third rubber mixture, which has been provided, onto the decor carrier material through the cutouts in the first template or through the cutouts in the second template to form a second section of the decor layer.

18. The method according to claim 3, wherein the decor carrier material with the decor layer has been manufactured by:
providing the decor carrier material in sheet form;
providing the second rubber mixture for the decor layer;
providing at least one first template with contoured cutouts, whereby the template has a limited length;
placing the first template onto the decor carrier material and adding the second rubber mixture to the decor carrier material through the cutouts of the first template to form a first section of the decor layer;
advancing the carrier material;
again placing the first template or placing a second template with limited length and comprising contoured cutouts onto the decor carrier material and adding the second rubber mixture or an additional third rubber mixture, which has been provided, onto the decor carrier material through the cutouts in the first template or through the cutouts in the second template to form a second section of the decor layer.

19. The method according to claim 4, wherein the decor carrier material with the decor layer has been manufactured by:
providing the decor carrier material in sheet form;
providing the second rubber mixture for the decor layer;
providing at least one first template with contoured cutouts, whereby the template has a limited length;
placing the first template onto the decor carrier material and adding the second rubber mixture to the decor carrier material through the cutouts of the first template to form a first section of the decor layer;
advancing the carrier material;
again placing the first template or placing a second template with limited length and comprising contoured cutouts onto the decor carrier material and adding the second rubber mixture or an additional third rubber mixture, which has been provided, onto the decor carrier material through the contoured cutouts in the first template or through the cutouts in the second template to form a second section of the decor layer.

20. The method according to claim 19, wherein the decor carrier material provided has been produced together with the decor layer, in that again placing of the first template or placing of the second template is made offset to the first placing in such a way that the second section of the decor layer has an overlapping area with the first section of the decor layer.

* * * * *